July 25, 1939.  C. G. SUITS  2,167,536
SUBMARINE SIGNALING
Filed June 9, 1937
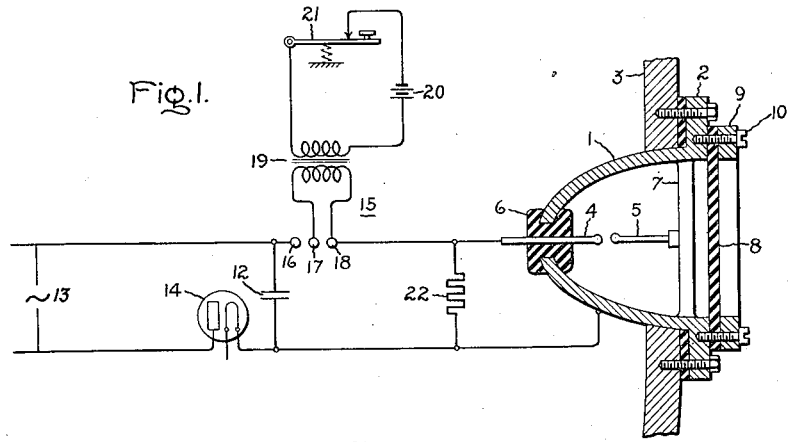
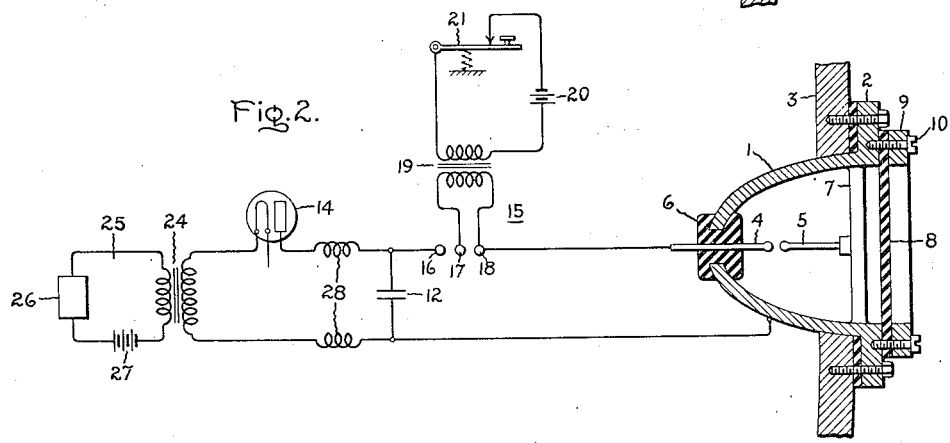
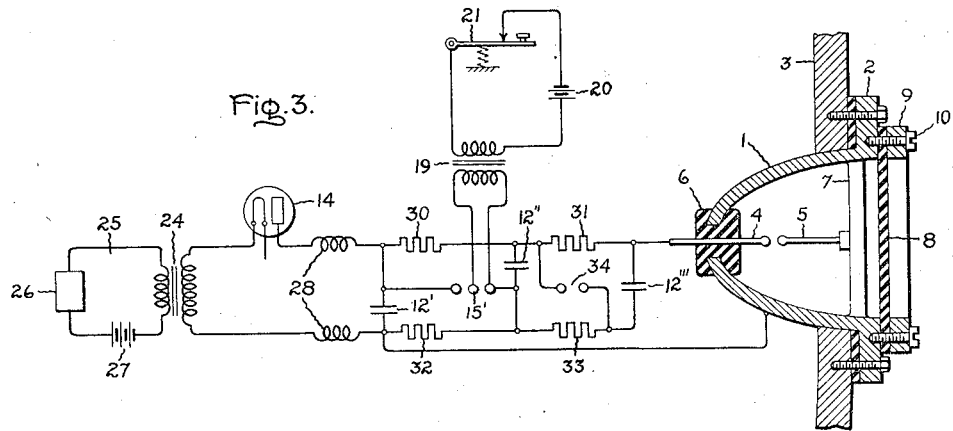
Inventor:
Chauncey G. Suits,
by Harry E. Dunham
His Attorney.

Patented July 25, 1939

2,167,536

UNITED STATES PATENT OFFICE 2,167,536

SUBMARINE SIGNALING

Chauncey G. Suits, Schenectady, N. Y., assignor to General Electric Company, a corporation of New York Application June 9, 1937, Serial No. 147,285

1 Claim. (Cl. 177—386)

My invention relates to submarine signaling of that type in which sound waves are produced in a liquid by an electric discharge therethrough and it has for its object the provision of improved apparatus of that type for producing a sound wave having a steep wave front whereby the signal is sharp and intense.

My invention will be better understood from the following description taken in connection with the accompanying drawing, and its scope will be pointed out in the appended claim.

Referring to the drawing, Figs. 1, 2 and 3 show several forms of my invention each being a combined circuit diagram and a cross-sectional view of a liquid spark gap.

In the several figures of the drawing I have represented the liquid spark gap as mounted in the casing 1 which preferably is shaped to reflect the sound wave in substantially a single direction and is shown provided with the flange 2 by which it is adapted to be secured to a supporting structure 3, which, for example, may be the hull of a ship. The discharge takes place between the electrodes 4 and 5, the former being mounted in the insulating bushing 6 in the inner end of the casing and the latter being mounted on the strut 7 extending across the mouth of the casing. Where the liquid spark gap is to be submerged in fresh water which is of relatively high resistance the mouth of the casing may be left open. Where, however, the gap is to be submerged in sea water, which has a relatively low resistance, I prefer to close the mouth of the casing and keep the casing filled with fresh water or other liquid of relatively high resistance. For maintaining the casing tightly closed I have shown it provided with the diaphragm 8 which by means of the ring 9 may be clamped snugly by means of the screws 10 against the mouth of the casing.

I cause a heavy electric discharge to occur between the electrodes 4 and 5 of the liquid gap by discharging therethrough a relatively large amount of electric energy stored up in a capacitor and I control the discharge of the capacitor by means of an air gap. In Fig. 1 the capacitor which supplies the energy for the discharge at the liquid gap is represented at 12 which capacitor may, for example, have a capacitance of 2 mf. This capacitor may be charged in various ways. In Fig. 1 I have shown it arranged to be charged by an alternating current obtained from the source 13, which, for example, may have a voltage of 30,000 volts, the current being rectified by the electron discharge rectifier 14.

For controlling the discharge of the capacitor 12 through the liquid gap I employ the three-sphere gap device 15 which comprises the spaced spheres 16, 17, and 18. Spheres 17 and 18 are connected to the terminals of the secondary winding of the induction coil or transformer 19, the primary of which includes the battery 20 and the key 21. The spacing of the spheres 16 and 17 is such that the potential difference across the capacitor 12 corresponding to the peak voltage of the charging circuit is insufficient to cause the gap between those spheres to break down although preferably a small increase only is necessary in the voltage applied to that gap to cause it to break down. The capacitor 12 connects through the three-sphere gap 15 with the terminals 4 and 5 of the liquid gap, the terminals being preferably shunted by the resistor 22.

When a signal is to be transmitted the key 21 is pressed down thus breaking the circuit of the primary of the transformer 19. The resulting voltage impulse of the secondary impressed between the spheres 17 and 18, which impulse being added to the potential difference between gaps 16 and 17 by reason of the charge on the capacitor, causes both air gaps to break down. By reason of the large amount of energy stored in the capacitor 12 a heavy discharge follows at the liquid gap with the result that a sound wave is produced having a steep wave front which gives a sharp and intense sound.

In the modified form shown by Fig. 2 the capacitor 12 is charged by the rectified current obtained through the step-up transformer 24 from a direct current circuit 25 containing the vibrator 26 and the battery 27. In this form of my invention I have also shown the choke coils 28 arranged in the charging circuit.

In the modified form shown in Fig. 3 I employ a plurality of capacitors 12', 12" and 12"' instead of a single capacitor as in the previous modifications and I arrange these capacitors in accordance with the well known Marx circuit whereby the capacitors are charged in parallel from the same charging circuit but are discharged in series. The charging circuit for capacitors 12" and 12"' includes the resistors 30, 31, 32, and 33. The discharge circuit of the three capacitors includes the three-sphere gap 15' and the sphere gap 34. Control of the discharge of the capacitors is effected by the key operated apparatus similar to that described above in connection with Fig. 1 whereby when the key is operated the three-sphere gap 15' is caused first to break down. By this breakdown the potential difference of capacitor 12' is added to that of capacitor 12" and the combined potential difference causes gap 34 to break down thereby adding the potential difference of the third capacitor 12'''. The potential difference applied to the liquid gap thereby is the sum total of the potential differences of the three capacitors.

I have chosen the particular embodiments described above as illustrative of my invention and it will be apparent that various other modifications may be made without departing from the spirit and scope of my invention which modifications I aim to cover by the appended claim.

What I claim as new and desire to secure by Letters Patent of the United States is:

Apparatus for producing a submarine signal having a steep wave front comprising a capacitor, means for charging said capacitor, a liquid spark gap connected to receive a discharge from said capacitor and means for controlling said discharge comprising a plurality of air gaps in series in said connection, a resistor connected across said liquid gap and means for applying a potential difference across one of said air gaps to cause the other gap to break down.

CHAUNCEY G. SUITS.